United States Patent [19]

Seyler

[11] Patent Number: 4,546,568

[45] Date of Patent: Oct. 15, 1985

[54] ALL-METAL LIVE TRAP

[76] Inventor: Edwin E. Seyler, Box 339, 403 S. Oak, Townsend, Mont. 59644

[21] Appl. No.: 436,807

[22] Filed: Oct. 26, 1982

[51] Int. Cl.[4] .................................................. A01M 23/16
[52] U.S. Cl. ........................................... 43/61; 43/62; 43/67
[58] Field of Search .............................. 43/61, 62, 67

[56] References Cited

U.S. PATENT DOCUMENTS

| 60,143 | 12/1866 | Clarke | 43/61 |
|---|---|---|---|
| 2,087,644 | 7/1937 | Harbison | 43/67 |
| 2,562,809 | 7/1951 | Mogren | 43/61 |
| 2,587,748 | 3/1952 | Merkl | 43/61 |
| 2,616,210 | 11/1952 | Reeb | 43/61 |
| 2,736,984 | 3/1956 | Deane | 43/61 |
| 3,055,139 | 10/1962 | Condello | 43/61 |
| 3,190,030 | 6/1965 | Gilbaugh | 43/61 |
| 3,823,504 | 7/1974 | Posch | 43/61 |
| 3,975,857 | 8/1976 | Branson | 43/61 |
| 4,232,472 | 11/1980 | Muelling | 43/61 |
| 4,342,172 | 8/1982 | Guanci | 43/61 |

*Primary Examiner*—Nicholas P. Godici
*Assistant Examiner*—Kurt Rowan
*Attorney, Agent, or Firm*—A. W. Breiner

[57] ABSTRACT

An animal trap wherein the housing is formed of sheet metal and the trap door is of a mesh construction wherein the animal can in no way gain access to one carrying the trap or one disposed adjacent to the trap. At the same time, the animal may be identified through the open-mesh trap door. The trap door is normally disposed in a recessed position underlying the vertical wall; and, when released by a control mechanism actuated by a trap pan, the door will automatically fall by gravity to a trap-closing position. The door is then locked in this trap-closing position by means of a latch rod which has a roughened or threaded surface which interlocks with a clip. The housing, being formed of sheet metal and being substantially imperforate, may be utilized for the purpose of destroying the animal either by drowning or gassing.

2 Claims, 4 Drawing Figures

U.S. Patent  Oct. 15, 1985  Sheet 1 of 2  4,546,568
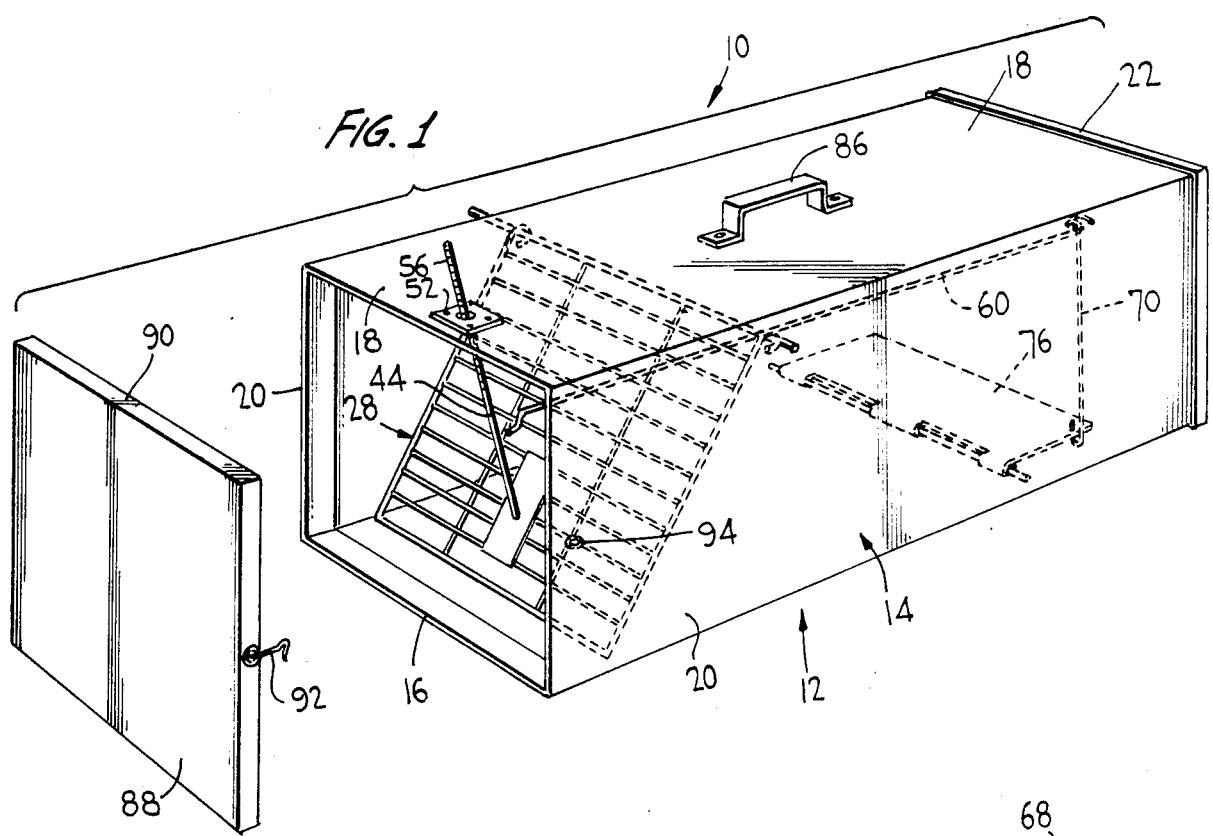
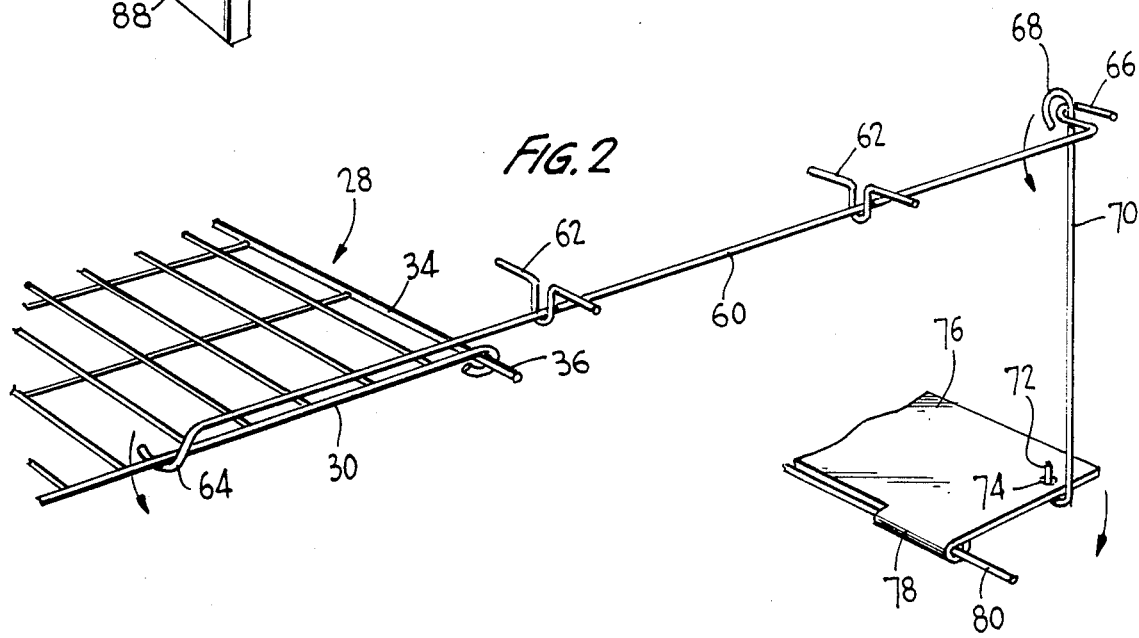

ALL-METAL LIVE TRAP

This invention relates in general to new and useful improvements in animal traps; and more particularly to an animal trap which is so constructed wherein when the trap is actuated, the animal is positively captured and the trap may be utilized to facilitate the disposal of the trapped animal without any possibility of harm to the user.

More particularly, this invention relates to an animal trap wherein the housing thereof is formed of sheet metal and includes an elongated tubular body having one end closed by a sheet metal end wall. The opposite end of the tubular body is open. The housing is provided with a mesh-type trap door, the trap door when actuated serving to bar exit of the trapped animal through the open end of the housing while at the same time permitting viewing of the animal to determine the type and condition of the animal.

The animal trap is provided with a control mechanism which normally holds the trap door in an open position, and which is movable when actuated to release the trap door. The control mechanism includes a latch finger normally holding the trap door in an open, out-of-the-way position, and there being a mechanism for springing the latch finger to an out-of-the-way position to release the trap door. The latch finger is preferably of a generally U-shaped configuration and has positioned therein a bar-like portion of the trap door whereby the trap door is firmly held in its open position; but, when the latch finger is rotated, it will disengage from the trap door and permit the trap door to be released and to swing by gravity down to its trap closing position.

Another feature of the invention is the provision of latch means for maintaining the trap door in its lowered, downwardly and axially sloping position preventing the escape of an animal trapped within the housing. The latch means includes a roughened rod which is securely connected at one end to the trap door and which extends through an opening in the top wall of the housing body. The roughened rod portion also extends through a retaining clip which is lockable with the roughened surface of the rod.

Also, while the trap door is of a meshed construction so as to permit viewing of the animal trapped therein, the trap may be provided with a removable cover which will telescope over the open end of the housing body to form a total enclosure.

The sheet metal construction of the main portion of the trap permits the trap to be readily handled without the possibility of being bitten or scratched by the entrapped animal. Furthermore, the housing may be utilized as a container for a liquid, and facilitates the destroying of the animal either by drowning or by the introduction of certain poisonous gases. At the same time, the trap door may be opened by a person located behind the trap or other out-of-the-way position without danger of that person being bitten or scratched.

Having described the invention in general terms, specific and presently preferred embodiments will be set forth in the context of the illustrated drawing.

FIG. 1 is a perspective view of the animal trap formed in accordance with this invention, with the trap door being shown in an animal-retaining position and a closure cover for the open end of the housing in detached, spaced position.

FIG. 2 is a perspective view showing the mounting of the trap door and the control mechanism for effecting a release thereof once an animal has been trapped within the housing.

Figure 4:
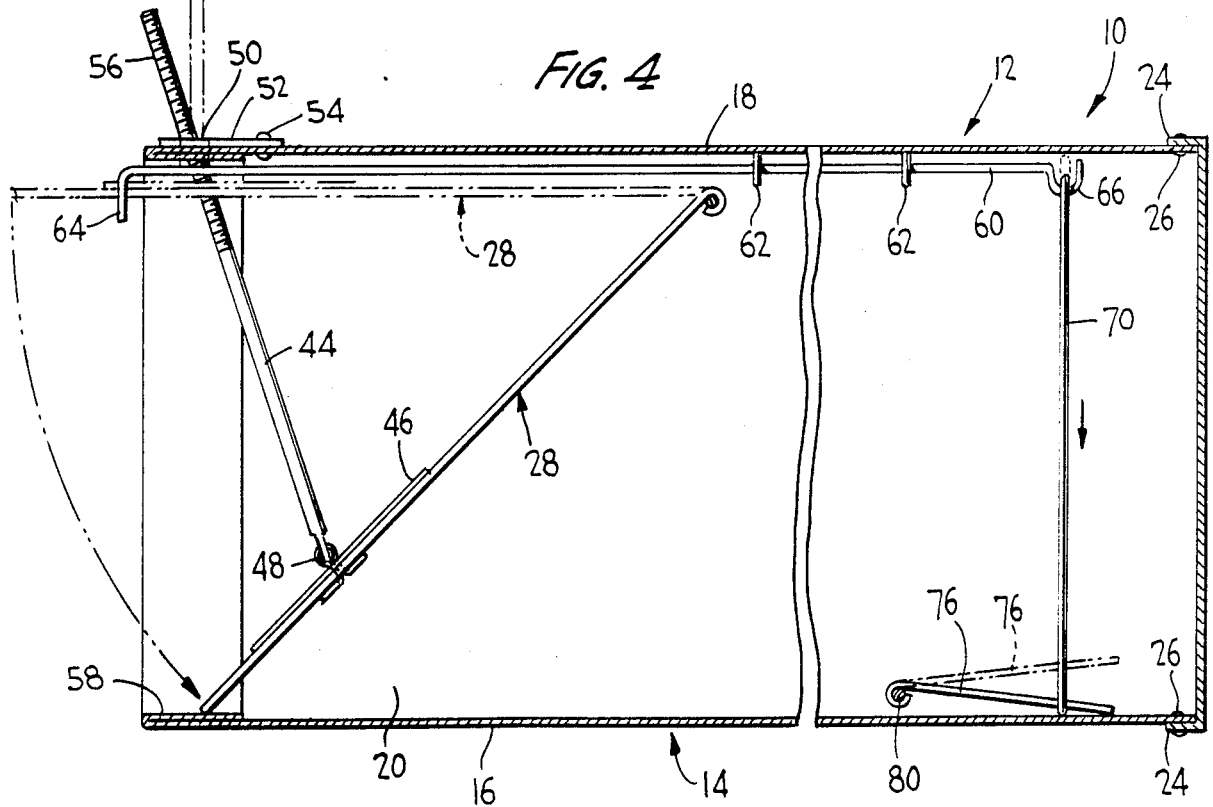

FIG. 4 is a longitudinal vertical sectional view taken generally along the line 4—4 of FIG. 1 and shows the specific mounting of the trap door within the housing, the control mechanism for effecting the release of the trap door, and the latch mechanism for latching the trap door in a lowered, animal-trapping position. Referring to the drawing in detail, it will be seen that the animal trap formed in accordance with this invention is generally identified by the numeral 10. The animal trap 10 includes a housing which is generally identified by the numeral 12. The housing is of a sheet metal construction and includes an elongated tubular body 14 which is of a generally rectangular cross-section. The body 14 includes a bottom wall 16, a top wall 18, and a pair of sidewalls 20.

When formed, the body 14 has open ends. However, a sheet metal cover or panel 22 fixedly secured to the body 14, or by means of suitable fasteners such as rivets, closes one end of the body 14. The panel 22 may be provided with a peripheral flange 24, as is best shown in FIG. 4, which is secured in place relative to the body 14 by means of suitable rivets or like fasteners 26.

In use, one end of the housing 12 is open to facilitate the entry of the animal to be trapped. The open end of the housing 12 is intended to be closed by an open-mesh type trap door 28. The trap door 28 is preferably provided with a wire frame 30 having extended between side portions thereof parallel wires or bars 32. An upper leg 34 of the wire frame 30 is provided with extensions 36 and 38 which extend through apertures in the upper portion of the sidewall 20 as shown in the drawing.

The extensions 36 and 38 are provided with suitable retaining pins such as cotter pins 40, and preferably carry between the cotter pins 40 and the adjacent sidewall 20 a washer 42.

As is best shown in FIG. 4, the trap door 28 is normally positioned in an inoperative position underlying the top wall 18 of the housing body 14. When released, the trap door 28 automatically swings downwardly by gravity to a solid line position of FIG. 4.

The trap door, when lowered, is locked in its lowered animal retaining position by a latch rod 44 which is pivotally connected to a plate 46 carried by the trap door 28 by means of a suitable fastener such as a cotter key 48. The upper part of the latch rod 44 extends through an opening in the top wall and through an opening 50 in a locking or retaining clip 52 which is formed of resilient sheet metal and is fixedly secured to the upper surface of the top wall 18 by means of fasteners such as rivets 54. The free end portion of the latch rod 44 is roughened, for example by being provided with threads 56, so as to interlock with the retaining clip 52.

It is to be understood that when the trap door 28 is in this lowered position of FIG. 4, it is prevented from being swung upwardly to an animal-releasing position by the interlocking of the threads 56 with the retaining clip 52.

At this time it is pointed out that, if so desired, the open end of the housing body 14 may be reinforced or stiffened by reversely folding, as at 58, the bottom, side, and top walls of the housing body 14.

The trap door 28 is provided with a control mechanism which is best shown in FIG. 2. The control mechanism includes a longitudinally extending, elongated control rod 60 which is carried by a pair of supports 62 suitably secured to the underside of the top wall 18. The control rod 60 terminates at its forward end in a generally U-shaped finger 64 which engages and underlies a side rod portion of the trap door frame 30.

Figure 3:
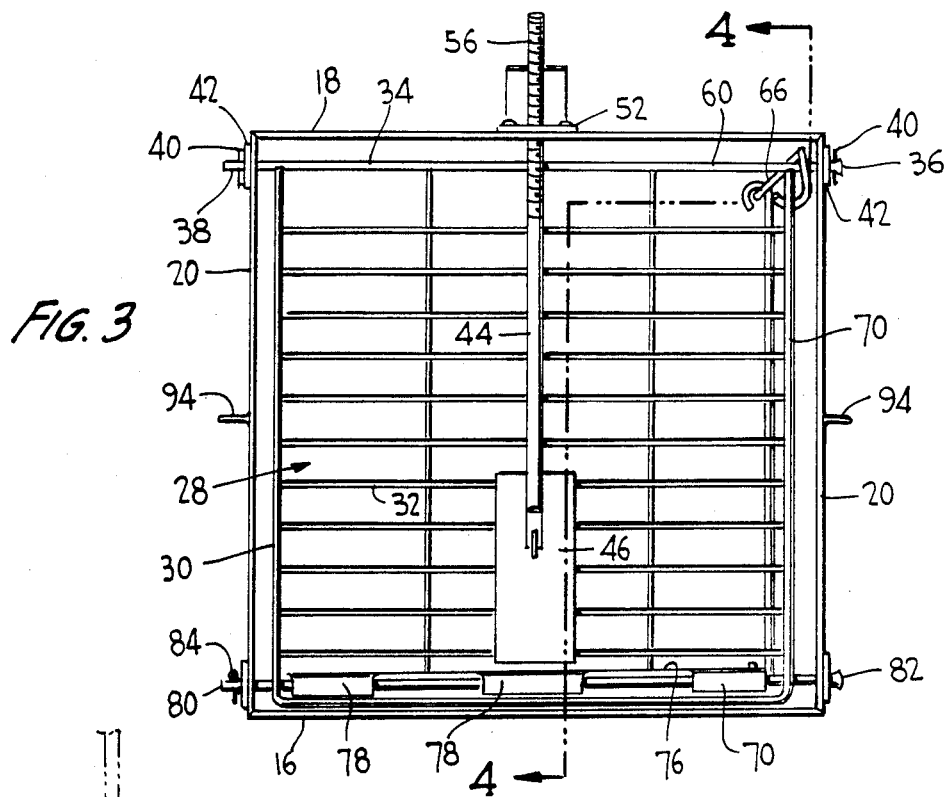
FIG. 3 is an enlarged elevational view of the animal trap as viewed from the open end, and shows further the details thereof.

The opposite end of the control rod 60 is provided with a crank 66 which is engaged with a hook eye 68 of an actuating rod 70. The lower end of the actuating rod 70 is generally J-shaped and includes an offset, upstanding end 72 which passes upwardly through an opening 74 in a trap pan 76. The trap pan 76 is provided along its forward edge with spaced sleeve portions 78 through which a mounting rod 80 extends and which pivotally mounts the trap pan 76. The rod 80, as is best shown in FIG. 3, is provided at one end with an enlarged head 82 and at the opposite end with a removable pin or clip such as the cotter pin 82.

It will be readily apparent from FIGS. 2 and 4 that once an animal has entered the housing 12 and has engaged the elevated trap pan 76 on which food is normally placed, the trap pan 76 swings downwardly around the rod 80 and the actuating rod 70 will pull down on the crank 66, rotating the control rod 60 in a counter-clockwise direction so as to release the trap door 28 as is shown in FIG. 2. Trap door 28 will then fall down to its closed position as shown in FIGS. 1 and 4, and trap the animal within the housing 12.

In order to facilitate carrying of the animal trap 10, particularly after an animal has been trapped therein, the top wall 18 is provided with a suitable handle 86. Further, when it is desired to carry the animal a considerable distance and to ensure against accidental release, the housing 12 may be provided with a removable end cap 88 which has peripheral flanges 90 for telescoping over the body 14. Two side flanges are provided with hook elements 92 which are engageable with eyes 94 carried by the sidewalls 20 of the trap adjacent the forward edges thereof.

It is to be understood that the afore-described trap has many advantages not found in open wire-mesh traps now on the market. The solid metal housing eliminates the chance of a child or other person being bitten by a trapped animal. Accordingly, the trap is extremely safe for use in public areas.

A trapped skunk may be carried by the trap handle to any location by the user without fear of being sprayed, clawed, or bitten.

By placing the trap door lock on the top and outer side of the trap, the user of the trap can open the trap door and lock it open from behind the trap. Thus, any trapped animal can be released by the user without fear of being bitten.

Inasmuch as the trap door is formed of wire mesh and countersunk inside the trap, any trapped animal can be identified from a distance.

Finally, a trapped animal cannot reach outside the trap and dig up the lawn, garden, or flowerbed.

Thus, in view of the foregoing, the trap is ideal for use in public areas, particularly areas where rabies are prevalent, in that the user will never come into contact with the trapped animal and the general public is safe with respect thereto.

It is to be understood that when an animal is trapped and it is desired to eliminate the animal, the trap may be stood on its closed end 22 and filled with water from a hose and kept filled until the animal is drowned. On the other hand, if there is a nearby creek or other source of water, the entire trap may be readily submerged.

Because the housing of the trap is solid, formed of sheet metal, an animal may be gassed within the trap.

Other advantages of the trap will become apparent to a user.

Although only a preferred embodiment of the trap has been specifically illustrated and described herein, it is to be understood that minor variations may be made in the trap without departing from the scope of the invention as defined by the appended claims.

It is claimed:

1. An animal trap comprising a sheet metal housing in the form of a tubular body of rectangular cross-section and an end wall closing one end of said body, the other end of said body being open to permit entry of an animal, said housing being substantially imperforate to prevent accidental bites and scratches, a trap door for closing said open other end, said trap door being of a mesh construction and fully recessed within said body in a closed position of said trap door wherein a trapped animal may be seen and identified without endangering an observer, and control means normally holding said trap door in an open position and being movable when actuated to release said trap door, wherein said trap door is pivotally connected at an inner edge of said trap door to an upper part of said housing wherein when released said trap door drops to a downwardly and forwardly sloping closed position, and automatic latch means extending between said trap door and housing for locking said trap door in a lowered housing closing position, wherein said automatic latch means includes a rod pivotally connected at a lower end to said trap door and extending forwardly and upwardly through an opening in a top wall of said body, and cooperating latch means on said rod and said housing for locking said rod in a latch door closed and retaining position, wherein said cooperating latch means includes a roughened surface in the form of threads on said rod and a latch clip carried by said body top wall for automatic locking engagement with an aligned portion of said rod roughened surface in accordance with the closed position of said trap door as permitted by a trapped animal.

2. In an animal trap of the type including a tubular housing body and a trap door, said housing body having a bottom wall, side walls and a top wall, and open forward and closed rear ends, said trap door being pivotally connected at an inner edge of said trap door to a recessed upper part of said housing wherein when released said trap door drops to a downwardly and forwardly sloping closed position entirely within said housing, and automatic latch means extending upwardly and forwardly between said trap door and said housing top wall for locking said trap door in a lowered housing closing position, wherein said automatic latch means includes a rod pivotally connected at a lower end to said trap door and extending through an opening in the top wall of said body, and cooperating lach means on said rod and said housing body top wall for locking said rod in a latched door closed and retaining position, wherein said cooperating latch means includes a roughened surface in the form of threads on said rod and a latch clip carried by said body top wall for automatic locking engagement with an aligned poriton of said rod roughened surface in accordance with the closed position of said trap door as permitted by a trapped animal.

* * * * *